April 21, 1936.    H. E. WRIGHT    2,038,019
MULCH FERTILIZER PAPER
Filed Feb. 18, 1935
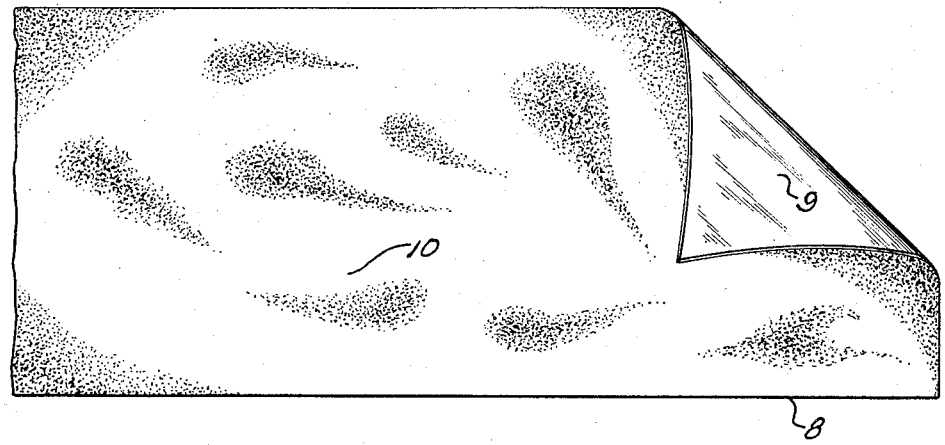
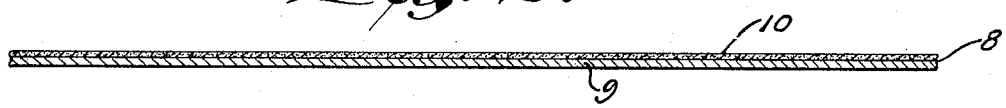
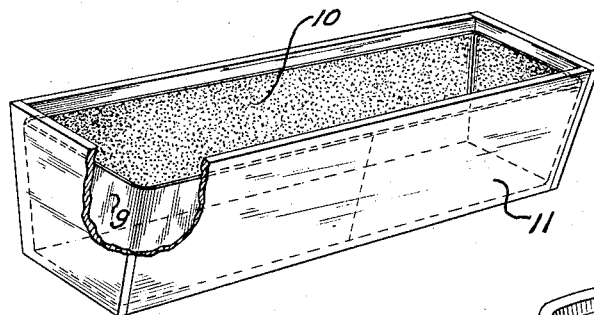
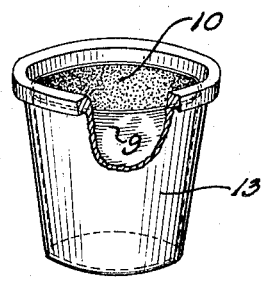
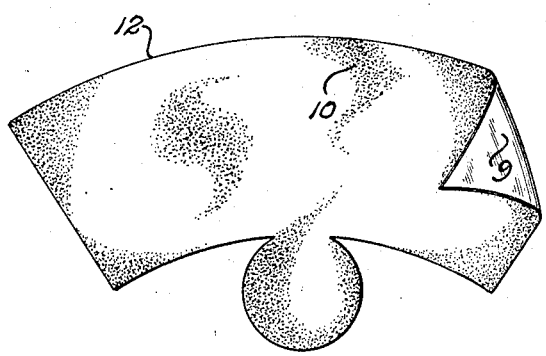
INVENTOR.
Harold E. Wright,
BY
Morsell, Lieber & Morsell
ATTORNEYS Patented Apr. 21, 1936

2,038,019

UNITED STATES PATENT OFFICE 2,038,019

MULCH FERTILIZER PAPER

Harold E. Wright, Appleton, Wis., assignor to Central Paper Company, Menasha, Wis., a corporation of Wisconsin Application February 18, 1935, Serial No. 7,063

5 Claims. (Cl. 47—9)

This invention relates to improvements in mulch fertilizer paper.

Many forms of mulch paper are in usage, the same being utilized by gardeners and the like for covering the ground between and around rows of growing plants or seeded areas for the general purpose of intensifying the growth of the plants, suppressing weeds, and eliminating cultivation. Heretofore, some attempts have been made in the art to provide a mulch paper having a fertilizing material combined therewith, whereby the paper will function not only to mulch the soil, but will also release fertilizers and plant nutrients into the soil. In these prior examples of mulch fertilizer paper, the paper was either formed as an envelope enclosing the fertilizing material, or else the paper was of a porous or absorbent nature impregnated with the fertilizer, or an agent carrying the same, whereby it was necessary that the paper rot or deteriorate in order to release the fertilizer. These prior attempts were impractical because they could not insure uniformity in the administering or releasing of the fertilizer, and were too expensive to manufacture to permit general adoption. The prior papers were also objectionable in that difficulties were presented in providing the proper amounts of the fertilizer required, without prohibitive costs, especially since only those fertilizers could be used which were rapidly soluble.

With the above difficulties in mind it is, therefore, a primary object of the present invention to provide a mulch fertilizer paper which has a surface thereof coated or gummed with a chemical substance which includes the new highly concentrated fertilizer salts.

A further object of the invention is to provide a mulch fertilizer paper wherein a moisture retaining, substantially impervious paper is provided with a surface layer of nitrogeneous adhesive mixed with desired soil corrective chemicals to produce a paper having a balanced fertilizer for any predetermined agricultural, horticultural, or lawn growing use, adapted to part with its fertilizer to the soil by a process of leaching by repeated distillation-condensation cycles, when used as a mulch or ground covering, or by direct leaching when used as a liner in a container, or as a container, having soil and plant life therein.

Another specific object of the invention is to provide a mulch fertilizer paper which can be used as a surface covering for soil in the ordinary manner, or which is susceptible of being fashioned into special configurations for usage as containers or as liners for flower pots, flower boxes, and the like.

A further object of the invention is to provide a mulch fertilizer paper in which the paper is neither of an absorbent nature nor of envelope formation, and which will not easily deteriorate or disintegrate, and which is coated with a substance including a nitrogeneous adhesive which gives both chemical and mechanical advantages to the product.

Still another object of the invention is to provide a mulch fertilizer paper in which a balanced fertilizer can be easily and economically obtained, and which will permit of variances in the fertilizer concentrations per square foot of paper to adapt the paper for various uses.

Another object of the invention is to provide a mulch fertilizer paper wherein the fertilizer is deposited into the soil therefrom by means of direct leaching, or by means of a combination of direct leaching and solar motivated distillation-condensation cycles.

Additional objects of the invention are to provide a mulch fertilizer paper which when used will serve to uniformly and gradually release fertilizer into soil in which plant life is embedded, which will conserve moisture, and which will facilitate transportation of plants for short distances and periods.

A further object of the invention is to provide a mulch fertilizer paper which is of very simple construction, which is strong and durable, which is inexpensive to manufacture, which is efficient in use, and which is well adapted for the purposes herein described.

With the above and other objects in view the invention consists of the improved mulch fertilizer paper, and its parts and combinations as set forth in the claims, and all equivalents thereof.

In the accompanying drawing in which the same reference characters designate the same parts in all of the views:

Fig. 1 is a plan view of a fragment of the improved mulch fertilizer paper;

Fig. 2 is a magnified or exaggerated longitudinal sectional view therethrough;

Fig. 3 is a perspective view of a flower box showing a specially shaped paper applied to the interior thereof as a liner, portions of the box being broken away;

Fig. 4 is a plan view of a mulch fertilizer paper blank for use as a flower pot liner; and Fig. 5 is a perspective view of a flower pot having an improved liner therein, a portion of the pot being broken away.

The improved mulch fertilizer paper may be formed in sheets of varying sizes and proportions, depending upon the specific usage to which it is to be put. A specific requisite of the paper per se is that it be practically non-porous and of a suitable density. Kraft paper, of a suitable weight, has been found to be very satisfactory for this purpose and the paper may be either black in color, or a natural brown, the latter being preferable for some purposes, while the black color is desirable when the paper is to be put to a use which will rely on radiant heat from the sun.

As shown in Figs. 1 and 2 a fragment of the improved mulch fertilizer paper is indicated generally by the numeral 8. The same has one ordinary layer 9 and to one surface of said layer there is applied a coating layer 10. The layer 10 actually adheres to the layer 9 and is not applied by impregnation. In the layer 10 one of the constituents is a nitrogeneous adhesive, such as animal glue or casein, which supplies nitrogen, and the adhesiveness required. In addition, in the coating layer the following materials are, or may be, included: soluble salts of phosphoric acid, potash, silica gel, calcium hydroxide, limestone. To these ingredients there may be added other suitable soil corrective agents such as siliceous materials or calcareous materials, sulphates, chlorates, and so forth. The weight of the coating or layer 10, or proportion of the mixture per unit of area of soil to be treated, can be accurately controlled over a range of from zero pounds per basis weight unit to more than one hundred and fifty pounds per basis weight unit. The materials composing the layer 10 need not be completely soluble in water, since the combined materials are applied as a coating and there is no impregnation or absorption as between the layers 9 and 10.

The mulch fertilizer paper formed in sheets or strips is adapted for use generally for covering soil between and around growing plants. It is applied with the coating layer 10 directly adjacent the soil and the fertilizing and soil correcting ingredients of the layer 10 are released to the soil by leaching and by repeated solar motivated distillation-condensation cycles.

It is also contemplated that the mulch fertilizer paper may be formed into special shapes for use as containers or as liners for plant containers. When used for this purpose the weight of the base layer 9 of the paper is somewhat lighter than that used for the purpose previously described, as is also the fertilizer weight of coat. As shown in Fig. 3, the inner surfaces of a flower or window box 11 may have suitably shaped strips of the paper applied thereto as a liner with the coated layers 10 being innermost. When the box is filled with soil and plants or seeds, the fertilizer will be gradually released to the soil principally by direct leaching.

Similarly, the improved paper may be cut into a blank 12 (see Fig. 4) of a shape suitable to fit the interior of a flower pot 13. The blank is applied to the flower pot in the manner shown in Fig. 5. In the usages illustrated in Figs. 3 and 5, the paper serves not only as an ordinary liner, but as a means for releasing desirable fertilizing and soil correcting chemicals directly into the soil. Ordinarily the chemicals will be completely released to the soil in several weeks' time.

While there is no specific illustration thereof, the invention also contemplates the formation of the improved paper into special shapes to be used as containers per se for soil and plant life. In such usages the containers may be of any desired shape but the constituency of the paper will be the same as that previously described.

From the foregoing description it will be seen that the improved mulch fertilizer paper is susceptible of a variety of uses and carries the fertilizing ingredients in a unique manner. The fertilizing ingredients may be readily varied and controlled and the present day highly concentrated fertilizer salts are utilized. In use, the fertilizing materials are released to the soil in a highly efficient and beneficial manner. The improved mulch fertilizer paper is, moreover, of simple and novel construction, and is well adapted for the purposes set forth.

What is claimed as the invention is:

1. As a new article of manufacture, a moisture retaining, substantially impervious paper provided with a coating of a nitrogeneous adhesive mixed with soil corrective chemicals.

2. As a new article of manufacture, a moisture retaining, substantially impervious paper provided on one surface with a soil treating coating, said coating including a nitrogeneous adhesive, soluble salts of phosphoric acid, potash, and other soil corrective chemicals.

3. As a new article of manufacture, a relatively heavy, moisture retaining, substantially impervious paper provided on one surface with a superimposed coating layer of soil fertilizing ingredients including a nitrogeneous adhesive mixed with soil corrective chemicals, said layer being carried by the paper in a manner so that ingredients thereof are releasable to soil by leaching and by solar motivated distillation-condensation cycles.

4. A mulch fertilizer paper, comprising a layer of moisture retaining, substantially impervious paper, a superimposed layer of fertilizing materials, and a nitrogeneous adhesive bonding the fertilizing materials together and to a surface of said paper layer.

5. A mulch fertilizer paper, comprising a layer of moisture retaining, substantially impervious paper, and a superimposed soil treating layer connected to a surface thereof, the ingredients of said soil treating layer including a nitrogeneous adhesive and highly concentrated fertilizer salts.

HAROLD E. WRIGHT.